United States Patent [19]

Mihic

[11] 4,195,956
[45] Apr. 1, 1980

[54] SLOTTING TOOL WITH EXCHANGEABLE CUTTING INSERT

[76] Inventor: Wlajko Mihic, 9, Tegnérvägen, S-802 28 Gavle, Sweden

[21] Appl. No.: 930,088

[22] Filed: Aug. 1, 1978

[51] Int. Cl.² .............................................. B26D 1/12
[52] U.S. Cl. ..................................... 407/108; 407/117
[58] Field of Search ................ 407/102, 108, 109, 117

[56] References Cited

U.S. PATENT DOCUMENTS

| | | | |
|---|---|---|---|
| 1,144,131 | 6/1915 | Hunter | 407/108 |
| 3,124,864 | 3/1964 | Frommelt et al. | 407/117 |
| 3,505,715 | 4/1970 | Germani | 407/108 |
| 3,561,086 | 2/1971 | Milewski et al. | 407/108 |
| 3,621,549 | 11/1971 | Billups | 407/108 |
| 3,673,657 | 7/1972 | Gustafson et al. | 407/108 |
| 3,774,276 | 11/1973 | Eckle | 407/109 |
| 3,894,322 | 7/1975 | Pano | 407/117 |

Primary Examiner—Harrison L. Hinson
Attorney, Agent, or Firm—Karl W. Flocks

[57] ABSTRACT

In slotting tools with exchangeable cutting inserts the insert is adapted to be clamped between two narrow jaws situated exactly above each other in the front end of a holder the lower jaw of which is formed integrally with the holder and defines the cutting seat. The upper jaw, the front portion of which reaches outside the principal part of the holder, consists of a loose member which is adapted to be inserted in a recess in the principal part of the holder, behind the cutting seat of the lower jaw, and is locked against lateral displacement. This loose member is retained in its position in the recess exclusively because of the tightening effect provided between the jaws over the clamped cutting insert.

7 Claims, 15 Drawing Figures

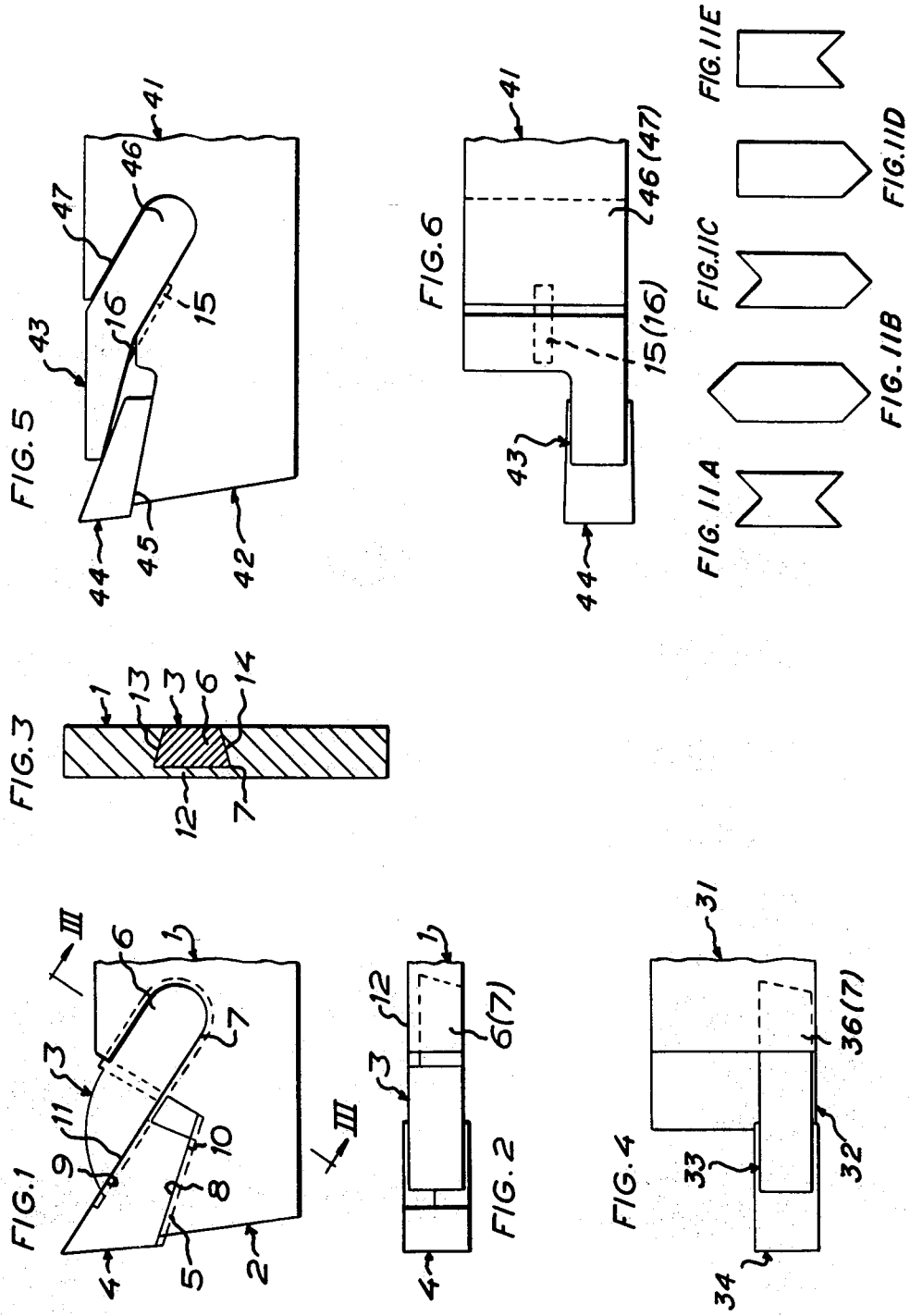

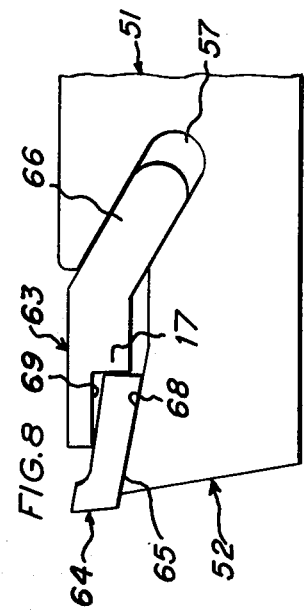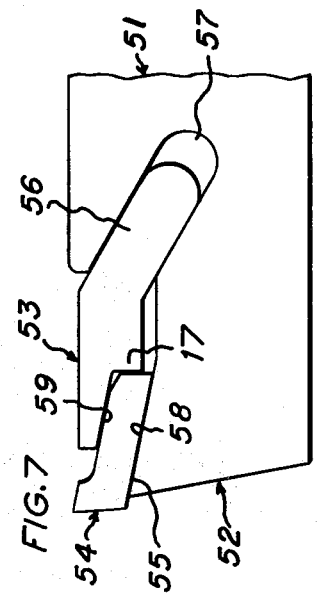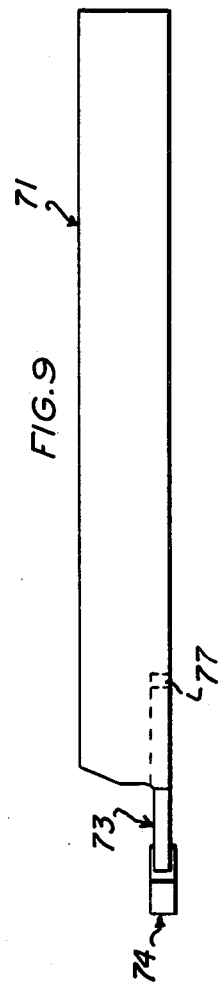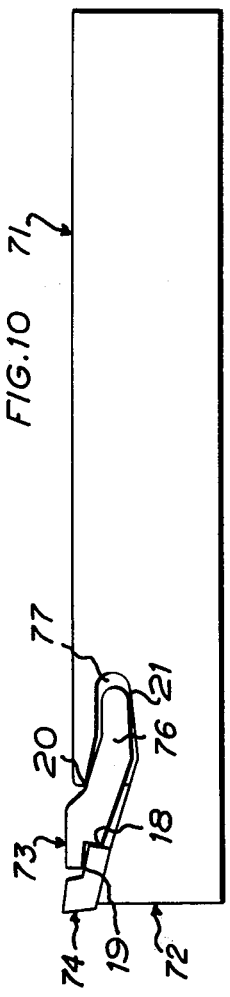

SLOTTING TOOL WITH EXCHANGEABLE CUTTING INSERT

The present invention relates to a slotting tool having an exchangeable cutting insert adapted to be clamped between two narrow jaws situated exactly above each other in the front end of a holder, the lower jaw consisting of a member formed integrally with the holder and defining the cutting seat. Characteristic of the invention is that the upper jaw, the front portion of which reaches outside the principal part of the holder, consists of a loose member which is adapted to be inserted in a recess in the principal part of the holder, behind the cutting seat of the lower jaw, and is locked against lateral displacement, said loose member being retained in its position in the recess exclusively because of the tightening effect provided between the jaws over the clamped cutting insert by the shearing forces acting upon the cutting insert, which forces are entirely absorbed by the jaws. With this invention it has thus been possible to make a very simple slotting tool with exchangeable cutting insert, since the loose jaw must not necessarily be provided with any particular retaining means for being retained to the holder. The slotting tool according to the invention involves a further advantage in that the holder of it may be used in combination with different loose jaws.

The invention will be more fully described hereinbelow with reference to the accompanying drawings which illustrate some embodiments of the slotting tool chosen by way of example, and in which:

FIG. 1 is a side view of one embodiment of the slotting tool, showing the front part thereof;

FIG. 2 is a top plan view of the same part;

FIG. 3 is a cross-section on line III—III in FIG. 1;

FIG. 4 is a top plan view of a second embodiment of the slotting tool showing the front part thereof;

FIG. 5 is a side view of a third embodiment of the slotting tool, showing the front part thereof;

FIG. 6 is a top plan view of said part;

FIG. 7 is a side view of a fourth embodiment of the slotting tool, showing the front part thereof;

FIG. 8 is a side view of a fifth embodiment of the slotting tool, showing the front part thereof;

FIG. 9 is a top plan view of a sixth embodiment of the slotting tool;

FIG. 10 is a side view thereof; and

FIGS. 11A–11E shows different cross-sections of the cutting insert to which the jaws of the slotting tool are to be adapted.

The slotting tool holder, designated by 1, is of constant thickness according to the embodiment illustrated in FIGS. 1–3. At its front end the holder 1 has two jaws 2 and 3 which are situated exactly above each other and between which the cutting insert 4 is adapted to be clamped in a cutting seat 5 defined by the stationary lower jaw 2. The lower jaw 2 is a direct polongation of the holder 1 and has thus the same thickness as the latter. The upper jaw 3 consists of a loose member which is adapted to be inserted by its rear portion 6 into a recess 7 in the holder 1 behind the cutting seat 5 of the lower jaw 2. When the upper jaw 3 is inserted by its rear portion 6 in the recess 7 in the holder 1 the jaw 3 is locked against lateral displacement. The upper jaw 3 is retained in position in the recess 7 because of the tightening effect obtained between the jaws 2 and 3 over the clamped cutting insert 4.

As is apparent from FIG. 1 the two opposite sides 8 and 9 of the jaws 2 and 3, placed exactly above each other, converge in inward direction. That is also the case with those sides 10 and 11 of the cutting insert 4 which cooperate with said sides 8 and 9, but in principle it is sufficient that either the sides 8 and 9 or the sides 10 and 11 converge inwardly to obtain the tightening effect required for retaining the loose jaw 3 by wedge action when the cutting insert is driven in between the jaws 2 and 3. In that case the rear portion 6 of the loose jaw 3 must take a bottom position in the recess 7 of the holder 1.

In the embodiment illustrated in FIGS. 1–3 the recess 7 in the holder 1 consists of a slot the sides 13 and 14 of which diverge towards the bottom 12 of the slot. The portion 6 of the upper jaw 3 coacting with the recess 7 is conformed to the recess 7 to prevent lateral displacement of the upper jaw 3 in the recess 7 of the holder 1. According to the drawings the recess 7 and the portion 6 are of dovetailed cross-section but the cross-section might as well be, for instance, T-shaped with inwardly directed stem. According to the drawings the recess 7 and the portion 6 have parallel sides but since the portion 6 is to reach the bottom of the recess 7 they may also have inwardly converging sides. Between the portion 6 and the recess 7 there may be a certain clearance which will be eliminated when the cutting insert 4 is clamped between the jaws 2 and 3. Because of said clearance a combined wedge and leverage action is obtained at least in certain cases, when the jaw 3 is pressed into the recess 7, which will be described more fully in connection with FIGS. 9 and 10.

In the embodiment according to FIGS. 1–3 the loose jaw 3 has the same width as the holder 1. The portion 6 of the jaw 3 has therefore been given a smaller width so that it can cooperate with the slot 7 provided with the bottom 12 without reaching outside the holder 1. In the embodiment of FIG. 4 the width of the holder 31, behind the stationary lower jaw 32, is larger than the width of the jaws 32 and 33. In this case the portion 36 may have the same width as the jaw proper 33, as illustrated in FIG. 4.

In the embodiment according to FIGS. 5 and 6, like the embodiment of FIG. 4, the width of the holder 31, behind the stationary lower jaw 42 is larger than the width of the jaws 42 and 43. Here the recess 47 consists of a slot extending transversely of the entire holder 41 for the portion 46 which is shaped in a corresponding manner and from which the jaw proper 43 projects. In this case the recess 47 in the holder 41 is itself provided with a longitudinally extending recess 15 adapted to cooperate with a bar 16 which is provided in the portion 46 of the upper jaw 43 and extends longitudinally thereof, to prevent lateral displacement of the upper jaw 43 in the recess 47 of the holder 1. According to a modified embodiment the bar 16 is located in the recess 47 while the recess 15 is located in the portion 46.

In the embodiment shown in FIG. 7 the portion 56 of the upper jaw 53 cooperating with the recess 57 in the holder 51 is guided in such a way in the recess 57 that the opposite sides 58 and 59 of the jaws 52 and 53 approach each other as the upper jaw 53 is displaced in inward direction. As the upper jaw 53 is provided with a shoulder 17 or the like for the cutting insert 54, the upper jaw 53 will be entrained by the cutting insert 54, when this is driven in between the jaws 52 and 53, and will thus provide the tightening effect required for retaining the upper jaw 53. In this embodiment the opposite sides 58 and 59 of the jaws 52 and 53 are parallel with each other in the various positions of displacement of the upper jaw 53. The portion 56 of the upper jaw 53 is movably guided between parallel sides of the recess 57 in the holder 57, said sides forming a minor angle with the sides 58 and 59 of the jaws so as to permit movement of the jaws 52 and 53 towards and away from each other. In this embodiment, like the embodiment of FIG. 8, the loose jaw 53 is locked against lateral displacement, for instance in the manner described above. The embodiment of FIG. 8 differs from the embodiment of FIG. 7 only in that the side 69 of the loose jaw 63 is not parallel with the side 68 of the stationary jaw 62. The front end of the loose jaw 63 might serve as a shoulder 17, if the cutting insert 64 is provided with a shoulder serving as entraining means.

In the embodiment according to FIGS. 9 and 10, like the previously described embodiments, the shearing force is transmitted on the cutting insert 74 via the loose jaw 73 to the holder 71. The loose jaw 73, which is in contact with the cutting insert 74 on points 18 and 19, is in this case in contact with the recess 77 of the holder 71 only on points 20 and 21, said point 20 being situated on the upper side at the opening of the recess 77 and the point 21 on the underside adjacent the bottom of the recess 77. These points of contact 18–21 consist of linear application between the respective elements. Owing to the configuration of the recess 77 and the jaw 73 and the disposition of the contact points 20 and 21 there is obtained a combined wedge and leverage action when the jaw 73 is pressed into the recess 77. The jaw 73 is wedged up between points 19, 20 and 21 at the same time as tightening force is exerted on the cutting insert 74 in point 19. This configuration, which is clearly apparent from the drawings, involves that the tightening force in point 19 increase with increasing load on the cutting insert holder.

The cross-section of the cutting insert is suitably one of the cross-sections shown in FIGS. 11A–11E, to which the two jaws 2 and 3 of the holder 1 are to be adapted to provide satisfactory lateral guidance. Thus, at least one and preferably both of the jaws 2 (32,42,52,72) and 3 (33,43,53,63,73) have on their oppisite sides 8 and 9 (or sides corresponding thereto in other embodiments) longitudinally extending grooves or ridges which are adapted to engage corresponding ridges or grooves in the cutting insert 4 (34,44,54,64,74).

In the embodiments of FIGS. 1–6 it is important that the inner end of the cutting insert 4 (or 44) is easy to get at to allow loosening of it. The inner end of the cutting edge 4 (or 44) is preferably situated right opposite a shoulder on the holder 1 (31,41) so as to permit insertion of a clamping tool between said parts. In the embodiments of FIGS. 7–10 it is important that the inner end of the loose jaw 53 (63,73) is easy to get at to permit loosening of this jaw and thus loosening of the cutting insert 54 (64,74).

The invention is not restricted to that which has been described above and shown in the drawings but may be modified within the scope of the appended claims.

What I claim and desire to secure by Letters Patent is:

1. A cutting tool comprising
   an exchangeable cutting insert,
   a holder to hold said cutting insert and having a recess therein,
   two narrow jaws clamping said cutting insert therebetween them,
   a first one of said jaws defining a cutting seat and formed integrally with said holder,
   a second one of said jaws positioned at least partially on the opposite side of said insert from said first jaw and being a loose separate member adapted to be inserted in said recess in said holder back to a position within the outwardly extended length of said cutting seat and locked against lateral displacement,
   said loose jaw having a portion guided in said recess in said holder to move said loose jaw toward said first jaw as said loose jaw moves inward in said recess,
   said loose jaw having a shoulder means for entraining with said cutting insert when said cutting insert is driven between said jaws to provide the tightening effect required for retaining said loose jaw.

2. The cutting tool of claim 1 wherein said jaws have sides clamping said cutting insert, said sides being parallel with each other in various positions of displacement of said loose jaw.

3. The cutting tool of claim 1 wherein a pair of points at the edges of said recess in said holder is engaged by said portion of said loose jaw coacting with said recess in said holder to clamp said cutting insert between said jaws by leverage.

4. The cutting tool of claim 1 wherein said recess in said holder is a slot with sides diverging towards the bottom of said slot and said portion of said loose jaw coacting with said recess in said holder being conformed to said recess to prevent lateral displacement of said loose jaw in said recess in said holder.

5. The cutting tool of claim 1 wherein said recess in said holder and said loose jaw have longitudinally extending cooperating elements to prevent lateral displacement of said loose jaw in said recess of said holder, said cooperating elements including a bar and a recess to receive said bar.

6. The cutting tool of claim 1 wherein at least one of said jaws has on its side coacting with said cutting insert and the cooperating side of said cutting insert have cooperating surfaces which surfaces include cooperating grooves and ridges.

7. The cutting tool of claim 6 wherein the other of said jaws has on its side coacting with said cutting insert and the cooperating side therewith of said cutting insert have cooperating surfaces which surfaces include cooperating grooves and ridges.

* * * * *